J. R. GOODMAN.
SAFETY DEVICE FOR AUTOMOBILES.
APPLICATION FILED MAY 23, 1918.
1,285,128.
Patented Nov. 19, 1918.
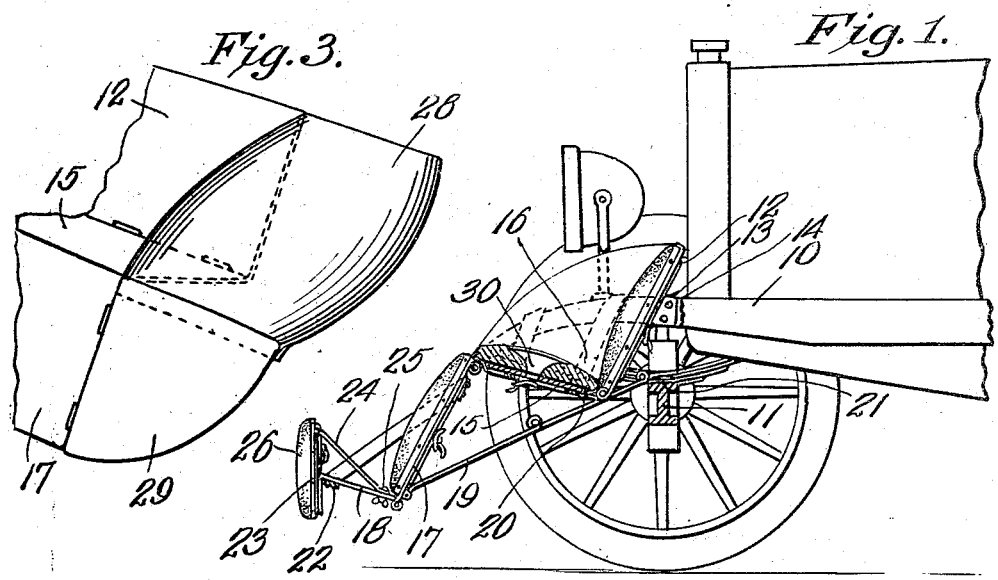
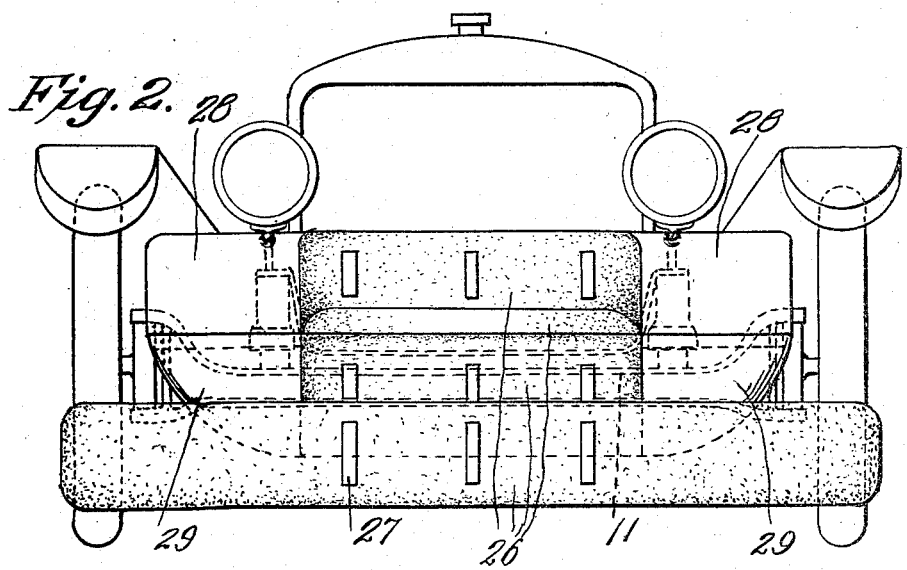
INVENTOR
Jacob R. Goodman,
WITNESSES
BY
ATTORNEY

UNITED STATES PATENT OFFICE.

JACOB R. GOODMAN, OF NEW YORK, N. Y., ASSIGNOR OF ONE-TENTH TO SAMUEL SCHEINDLINGER, OF NEW YORK, N. Y.

SAFETY DEVICE FOR AUTOMOBILES.

1,285,128.  Specification of Letters Patent.  Patented Nov. 19, 1918.

Application filed May 23, 1918. Serial No. 236,227.

*To all whom it may concern:*

Be it known that I, JACOB R. GOODMAN, a citizen of the United States, residing at New York, in the county of New York and State of New York, have invented certain new and useful Improvements in Safety Devices for Automobiles, of which the following is a specification.

This invention has relation to attachments for motor vehicles, and the nature and objects thereof will be readily apparent to those skilled in the art to which this invention appertains in the light of the following explanation of the accompanying drawings, illustrating what I now believe to be the preferred embodiment, or mechanical expression, of my invention from among other forms and arrangements within the spirit of the invention or the scope of the appended claims.

An object of the invention is to provide an attachment to motor vehicles in the nature of a fender designed to be located upon the forward end of a vehicle and to receive without injury the body of a person accidentally struck.

Another object of the invention is to provide a fender for motor vehicles embodying a seat provided with cushions to prevent the bruising of the body of a person falling to the seat, and a bumper cushioned and located forwardly of the seat in a position to strike the legs of a person at a point below the knee so as to cause the body to fall toward the seat.

A still further object of the invention is to provide a fender of the character above set forth which is constructed in a manner so as to be folded when desired to occupy as little room as possible in the forward end of the vehicle, or to be extended when the vehicle is traveling through a crowded thoroughfare.

In addition to the foregoing my invention comprehends improvements in the details of construction and arrangement of the correlative parts to be hereinafter more fully described and particularly set forth in the appended claims.

In the accompanying drawings in which similar and corresponding parts are designated by the same characters of reference through out the several views in which they appear:—

Figure 1, is a fragmentary view in longitudinal section of the forward end of a vehicle illustrating the application thereto of my invention.

Fig. 2, is a view of a vehicle in front elevation with improved fender attached, and Fig. 3, is a detail view in perspective illustrating one of the shields.

With reference to the drawing 10 indicates a pair of longitudinal frame members of the chassis of a motor vehicle and 11 the axle, said frame members extending forwardly of the hood in the usual manner as shown in Fig. 1.

My attachment comprises a plate 12 forming the back rest of the seat, the same being extending transversely of the vehicle between the frame bars and supported by means of a transversely extending bar 13 to which it is secured, the latter having its terminals bent rearwardly and secured to the inner surfaces of the frame bars 10 by means of rivets or the like 14. The lower edge of the plate 12 is formed in a manner to permit the hinged connection thereto of the seat plate 15 which likewise extends transversely of the vehicle. To support the seat plate 15 when the same is in an extended position I provide a pair of transversely extending bars 16 which have their terminals bent upward and then secured to the upper surfaces of the frame bars 10 adjacent the forward end thereof. The intermediate portions of the bars 16 serve to support the plate 15 when the latter is rested thereupon. The forward edge of the seat plate 15 is likewise formed in a manner to permit the hinged connection thereto of the leg plate 17 which extends transversely of the vehicle and extends normally downward from the seat plate and is formed at its lower edge in a manner to permit the hinged connection thereto of the foot rest plate 18 which is adapted to extend forwardly. To form a support for the leg plate 17, I provide a brace consisting of a pair of hingedly connected sections 19 and 20, the section 19 being hingedly connected to the leg plate 17, while the section 20 is hingedly connected to a plate 21 which is secured to the axle 10. In the operative position of the fender the sections 19 and 20 are in alinement to brace the leg plate 17. To support the foot rest plate 18 in an extended position, I provide a cross bar 22 which extends beneath the plate 18 and has its terminals bent upward and secured to the rear face of the leg plate 17, the intermediate portion of the bar however, not being connected to the foot plate 18. The forward edge of the foot plate 18 is bent downward whereby the bumper plate 23 may be secured thereto, said bumper plate extending very nearly from one forward vehicle wheel to the other as shown in Fig. 2. A brace rod 24 is hingedly connected at one end to the late 23 and is adapted to be releasably connected to the foot plate 18 by means of a bolt and wing nut connection 25. Applied to the surface of the bumper plate 23, and the plates 17, 15 and 12 are cushions indicated at 26. In each instance the cushions are formed with a plurality of pairs of openings through which straps 27 extend, said straps also extending through openings in to the plates whereby their ends may be connected together by means of a buckle so that the cushions may be releasably held in place. Formed at each end of the back plate 12 is a convex shield 28 which is designed to cover the forward ends of the frame members 10 of the vehicle to prevent contact therewith of the body of a person. The shields it will be noted are curved forwardly and downwardly and terminate at a point adjacent the forward edge of the seat plate 15 when the same is in an extended position. To each end of the leg plate 17 there is hingedly connected a segmental shield plate 29, designed to overlap the lower ends of the shields 28. The cushions in some instances are formed with openings 30 which communicate with apertures in the plates upon which they rest so as to insure the drainage of water and the cushions should be covered with some suitable waterproof material to prevent deterioration.

In use, it will be obvious that the bumper cushion and plate is located at a point so as to strike the body of a person at a point below the knees whereby to cause the body of the person so struck to fall into the seat. To this end, the seat plate 15 and the foot plate 18 are inclined upwardly, and the back plate 12 and leg plate 17 are extended rearwardly. When the fender is to be folded all of the cushions are removed. The brace 24 is then disengaged at its rear end upon the plate 18 and the foot plate 23 moves relative to the plate 18 so as to engage the under side thereof. The plate 18 is then moved upward so as to engage the front face of the foot plate 17. The sections 19 and 20 of the brace are then broken so as to move the point of connection thereof downwardly whereby to engage the rear face of the plate 17 against the under face of the plate 15. The plate 15 is then moved up so as to engage its rear face against the forward face of the plate 12, thus disposing all the plates in contact and in a position adjacent the upper portion of the vehicle. Prior to the movement of the plate 17, however, the segmental shield 29 must be moved inward in contact with said plate 17.

The foregoing description and the drawings have reference to what may be considered the preferred, or approved form of my invention. It is to be understood that I may make such changes in the construction and arrangement and combination of parts, materials, dimensions, etc., as may prove expedient and fall within the scope of the appended claims.

Having thus described my invention what I claim as new and desire to secure by Letters Patent is:—

1. In combination with a motor vehicle, a fender in the form of a seat, means for mounting the fender on the forward end of the vehicle, a foot rest extending forwardly of the seat, and a cushioned bumper mounted on the foot rest and located in position to strike a person in a manner to cause the body to fall into the seat.

2. In combination with a motor vehicle, a seat, formed of a plurality of foldable sections, means for supporting certain sections upon the vehicle, a plurality of removable cushions supplied to the various members of the seat, and a cushion bumper located forwardly of the seat.

3. In combination with a motor vehicle, a fender in the form of a seat including a back plate rigidly mounted upon the vehicle, a seat and leg plate hingedly connected together and to the back plate, toward a closed position, and means for supporting the seat and leg plates when the same are in an extended position.

4. In combination with a motor vehicle, a fender in the form of a seat including a back plate rigidly mounted upon the frame, a seat plate hingedly connected to the back plate, a leg plate hingedly connected to the seat plate, bars extending transversely of the vehicle to support the seat plate when the latter is in an extended position, and a jointed brace bar for bracing the leg plate when the same is in an extended position and adapted to fold when the plates are folded.

5. In combination with a motor vehicle, a fender in the form of a seat, means for mounting the fender upon the vehicle, a foot plate hingedly connected to the seat, means for supporting the foot plate when the latter is in an extended position, a bumper plate carried by the foot plate in hinged engagement, bracing means releasably connecting the bumper plate to the foot plate and a cushion member secured to the bumper plate.

6. In combination with a motor vehicle, a fender including a back plate hingedly mounted upon the vehicle, a seat plate hingedly connected to the back plate, a convex shield secured to the ends of the back plate and extending over the frame of the vehicle and toward the forward edge of the seat plate when the latter is in an extended position, a leg plate hingedly connected to the forward edge of the seat plate, and a pair of segmental shields connected to the ends of the leg plate in hinged engagement to overlap the forward ends of the convex shields and to fold inward when the plates are moved toward folding position.

7. A fender for motor vehicles including a back plate, seat plate and leg plate hingedly connected together and means for supporting said plates upon the vehicle.

8. A fender for motor vehicles including a back plate, means for rigidly mounting the same upon the frame of a vehicle, a seat plate hingedly connecting the back plate, bars for mounting upon the frame to extend beneath the seat plate to support the same in extended position, a leg plate hingedly connected to the seat plate, a jointed brace rod for connecting the seat plate to axle of a vehicle, a foot plate hingedly connected to the leg plate, a brace bar for supporting the leg plate in extended position, a bumper plate hingedly connected to the foot plate, a disconnectible brace for disposing the bumper plate in a vertical position, a shield connected to each end of the back plate to extend over the frame of the vehicle, a shield connected to each end of the leg plate to overlap the first mentioned shield, and cushions applied to the bumper, leg, seat and back plates for the purpose set forth.

In testimony whereof I affix my signature in presence of two witnesses.

JACOB R. GOODMAN.

Witnesses:
ROSSIE R. GALTMAN,
JOHN E. BURCH.